Figure 1:
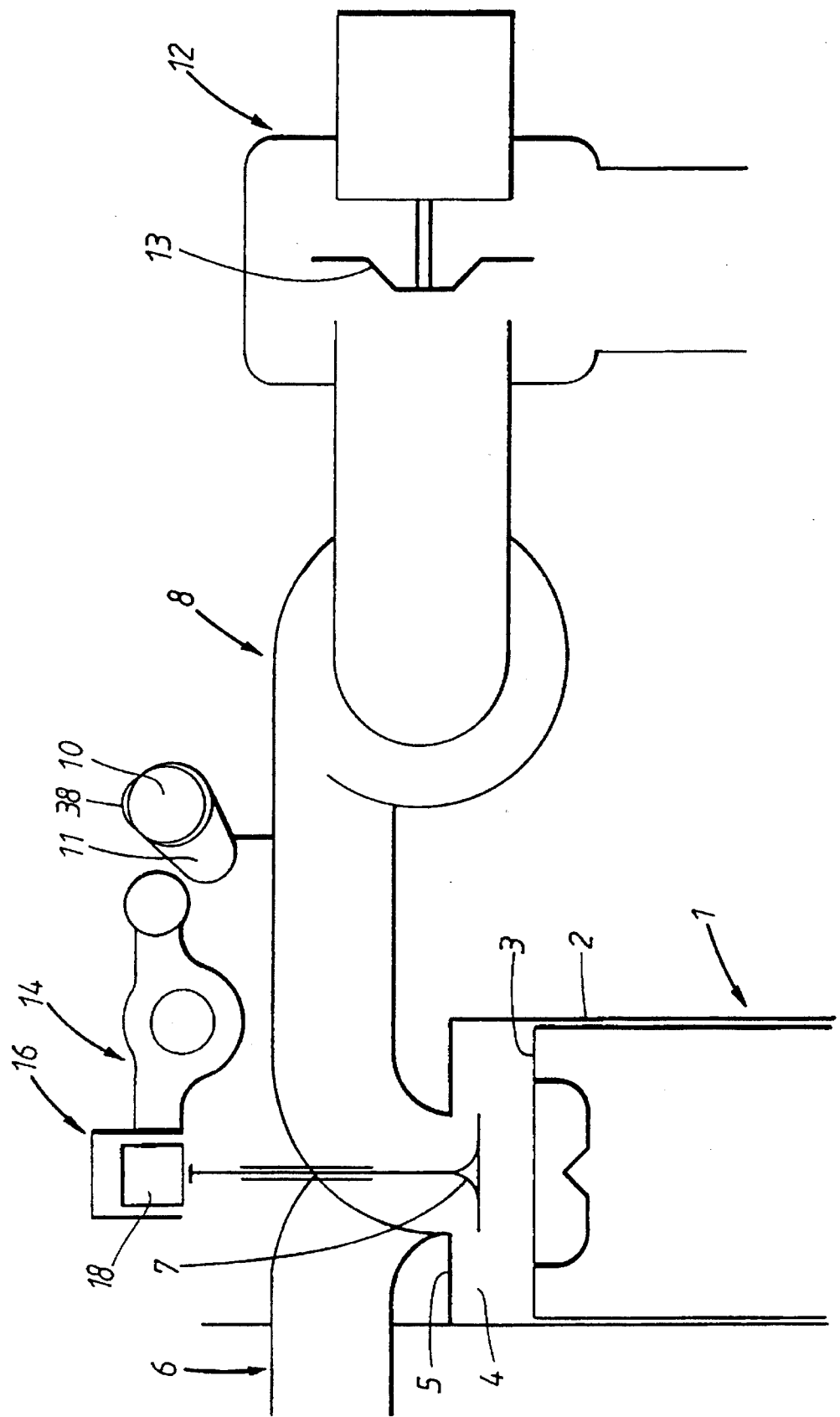

United States Patent [19]
Hakansson

[11] Patent Number: 5,564,385
[45] Date of Patent: Oct. 15, 1996

[54] METHOD AND DEVICE FOR MOTOR-BRAKING BY MEANS OF A MULTI-CYLINDER INTERNAL COMBUSTION ENGINE

[75] Inventor: Olof Hakansson, Stenkullen, Sweden

[73] Assignee: AB Volvo, Sweden

[21] Appl. No.: 347,389

[22] PCT Filed: May 27, 1993

[86] PCT No.: PCT/SE93/00467
§ 371 Date: Dec. 16, 1994
§ 102(e) Date: Dec. 16, 1994

[87] PCT Pub. No.: WO93/25803
PCT Pub. Date: Dec. 23, 1993

[30] Foreign Application Priority Data

Jun. 17, 1992 [SE] Sweden ................... 9201855

[51] Int. Cl.$^6$ ................... F01L 13/06
[52] U.S. Cl. ................... 123/321
[58] Field of Search ................... 123/90.16, 321

[56] References Cited

U.S. PATENT DOCUMENTS

| | | | |
|---|---|---|---|
| 3,367,312 | 2/1968 | Jonsson | 123/321 |
| 3,786,792 | 1/1974 | Pelizzoni et al. | 123/321 |
| 4,398,510 | 8/1983 | Custer | 123/90.16 |

FOREIGN PATENT DOCUMENTS

| | | |
|---|---|---|
| 0458857 | 2/1990 | European Pat. Off. . |
| WO91/08381 | 6/1991 | WIPO . |

Primary Examiner—Tony M. Argenbright
Attorney, Agent, or Firm—Lerner, David, Littenberg, Krumholz & Mentlik

[57] ABSTRACT

Methods and apparatus for engine retardation in multi-cylinder combustion engines are disclosed including a hydraulic clearance regulator for regulating the clearance in a valve controller in response to a hydraulic fluid pressure below a predetermined maximum value in which the angular position of the crankshaft of the engine at which the exhaust valve in one of the engine cylinders is operated by an extra ridge on the camshaft is determined by the clearance in the valve controller. A pressure relief valve maintains the hydraulic fluid pressure below the predetermined maximum value, and a controller gradually reduces the clearance towards zero while the hydraulic fluid pressure in the valve controller is maintained below the predetermined maximum value so that the risk of operating the exhaust valve during a cylinder pressure greater than a predetermined elevated cylinder pressure is substantially reduced.

7 Claims, 6 Drawing Sheets

METHOD AND DEVICE FOR MOTOR-BRAKING BY MEANS OF A MULTI-CYLINDER INTERNAL COMBUSTION ENGINE

TECHNICAL AREA

The present invention relates to a method for engine retardation with a multi-cylinder combustion engine, which for each cylinder with matching piston has at least one exhaust valve for control of the connection between a combustion chamber in the cylinder and an exhaust system, whereby the combustion cheer is connected to the exhaust system through opening of the exhaust valve at least when the piston in the cylinder is in the so called compression phase, said opening being achieved by a change of clearance in the valve mechanism of the combustion engine, thereby activating one or more extra cam ridges on the camshaft of the engine, which continuously activates the valve mechanism in dependence of the momentary position of the engine crankshaft through an actively adjustable, hydraulically operated clearance regulating device, which for active control of the engine retardation is adjusted between different positions by means of a hydraulic fluid pressure, whereby the angular camshaft position at which the exhaust valves are opened by the said extra cam ridge or ridges is dependent on the momentary clearance in the valve mechanism.

The present invention also concerns a device for realization of the method for engine retardation with a multi-cylinder combustion engine, which for each cylinder with matching piston has at least one exhaust valve for control of the connection between a combustion cheer in the cylinder and an exhaust system, whereby the combustion chamber is connected to the exhaust system through opening of the exhaust valve at least when the piston in the cylinder is in the so called compression phase, said opening being achieved by a change of clearance in the valve mechanism of the combustion engine, thereby activating one or more extra cam ridges on the camshaft of the engine, which continuously activates the valve mechanism in dependence of the momentary position of the engine crankshaft through an actively adjustable, hydraulically operated clearance regulating device, which for active control of the engine retardation is arranged to be adjusted by a hydraulic fluid pressure staying below a maximum value controlled by a pressure relief valve, whereby the camshaft angular position at which the exhaust valves are opened by the said extra cam ridge or ridges is dependent on the momentary clearance in the valve mechanism.

Especially for heavier vehicles, there are high demands on efficient engine retardation, which thereby reduces the wear on the wheel brakes and thus improves the operating economy.

STATE OF THE ART

By engine retardation with a four-stroke combustion engine a certain braking power is achieved due to the internal resistance of the engine, a.o. due to friction. This effect is however relatively small, and in modern engines it has been even further reduced. It is known to increase the engine retardation power through the installation of a restriction means, like a throttle in the exhaust system, e.g. in the form of a so called AT regulator. In this way, part of the work during the piston exhaust phase can be used to increase the braking power.

It is also known to increase the braking power by so called compression retardation. By opening some or all of the engine exhaust valves, a partial flow into the exhaust system of air being compressed during the compression phase is achieved, which means that part of the compression work obtained during the compression phase cannot be regained during the expansion phase, thus causing the braking power to increase. In one such known compression retarder the ordinary exhaust valves are used, whereby the camshaft has at least one extra cam ridge for achieving the extra opening of the exhaust valves. This extra ridge gives a relatively small lifting height and a controllable hydraulic element is arranged in the valve mechanism in order to activate the extra cam ridge only during engine retardation, see e.g. WO91/08381.

In this known retarder the hydraulic element consists of a clearance regulating device. This device is brought to uphold a prescribed clearance in the valve mechanism between the valves and the camshaft during normal operation and to reduce the clearance so that the extra cam ridge becomes active when the compression retarder is activated. Even if for emergencies there is a pressure relief valve integrated into the hydraulic element, there may by known devices occur detrimentally high cylinder pressures and thereby detrimentally high surface pressures in the valve mechanism when valves are opened too close to the upper dead centre. In known devices one has in such cases been forced to resort to earlier valve opening, which however gives a limited efficiency to the compression retarder.

The object of the present invention is to achieve a method and a device by which a high-grade compression retarder efficiency is obtained without detrimental influence on included components.

DESCRIPTION OF THE INVENTION

Said object is achieved by the method according to the present invention, which is characterized by that the respective clearance is gradually reduced to zero or close to zero while the pressure in the corresponding clearance regulating device is limited to a certain predetermined value, whereby, independently of when in time during the work cycle of a cylinder the engine retardation is initiated or terminated, the risk of an opening against a, from a stress aspect, too high cylinder pressure is eliminated.

Said object is further achieved by the device according to the present invention, which is characterized by that the pressure relief valve is arranged to control the clearance regulating device in such a way that the respective clearance is gradually reduced to zero or close to zero while the pressure in the corresponding clearance regulating device is limited to a certain predetermined value, whereby, independently of when in time during the work cycle of a cylinder the engine retardation is initiated or terminated, the risk of an opening against a, from a stress aspect, too high cylinder pressure is eliminated.

FIGURE DESCRIPTION

Figure 2:
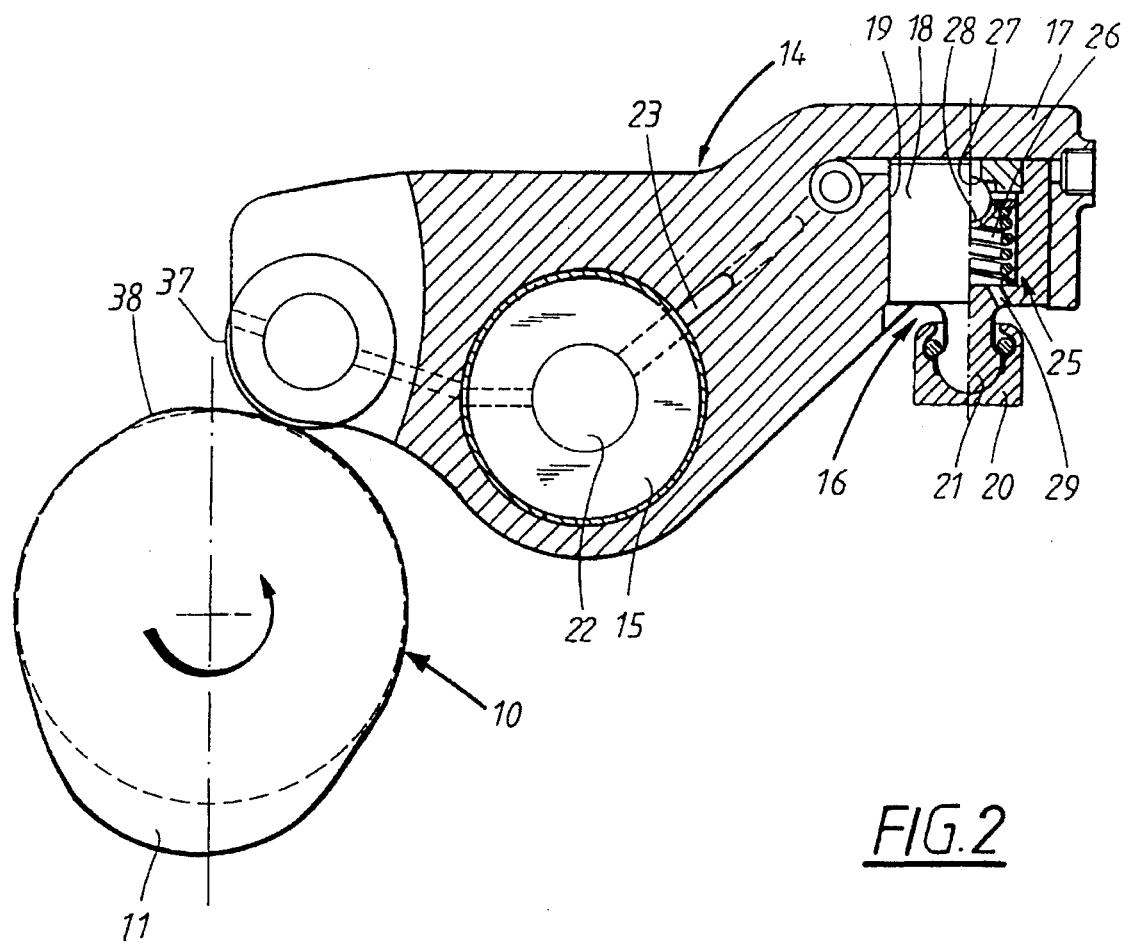
Figure 3:
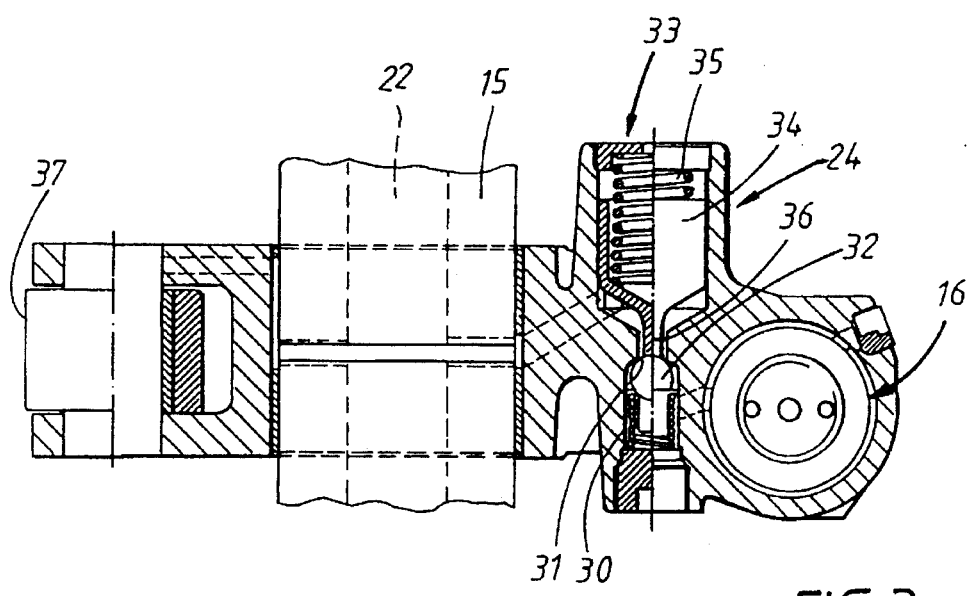

The invention is described below by an embodiment example referring to the enclosed drawings in which:

FIG. 1 shows a schematic cross section through a combustion engine equipped with a device according to the invention, FIG. 2 shows a cross section through a valve mechanism equipped with a hydraulic clearance regulating device according to the invention, FIG. 3 shows a cross section through the valve mechanism, along the line II—II in FIG. 2, FIGS. 4–7 show diagrams, illustrating the mode of operation of the clearance regulating device according to the invention.

PREFERRED EMBODIMENT

FIG. 1 shows schematically a four-stroke combustion engine, aimed at realization of the method according to the invention and to this end equipped with a device according to the invention. The engine according to FIG. 1 comprises an engine block 1 with a number of cylinders, of which for simplicity only one cylinder 2 is shown, containing a piston 3, which is connected to a crankshaft (not shown) by a connecting rod. Above the piston 3 in the cylinder 2 there is a combustion chamber 4, enclosed by a cylinder head 5. In the cylinder head there is arranged at least one inlet valve per cylinder, controlling the connection between the combustion chamber 4 and an inlet system 6, of which only part is shown. Furthermore, the cylinder head 5 comprises at least one exhaust valve 7 per cylinder 2, controlling the connection between the combustion chamber 4 and an exhaust system 8, of which only part is shown. The control of the inlet valve and of the exhaust valve 7 is arranged in the conventional way by one or more camshafts 10. In the shown example only one camshaft 10 has been included. As is the case by Diesel and Otto engines, the crankshaft creates a relative angular offset and thereby a time offset between the instantaneous movements of the individual pistons. The camshaft 10 creates in a similar manner, through different angular positions of its cams 11, a corresponding angular and time offset of the valve motions for the individual cylinders. The rest of the valve mechanism has been partly excluded for clarity. Other components of the engine are of less importance for the invention and are therefore not described closer here. When using the engine as a power source, the function does not differ markedly from what is known from other four-stroke combustion engines. This function is therefore not described closer here.

In the engine shown in FIG. 1 there is also an AT regulator with a restriction means 13 in the exhaust system 8. The restriction means 13 is controlled by a regulating device which independently of or in co-operation with the device according to the invention creates a restriction of the exhaust system and thereby an increased engine retardation in an as such known way.

FIG. 2 shows in more detail the design of the valve mechanism for obtaining the valve movement of in this case the exhaust valve 7 of one of the cylinders. The in the valve mechanism included camshaft 10 transfers its rotating motion to a rocker arm 14 arranged on a hollow rocker arm axle 15, intended to be fastened to the engine cylinder head by bolts not shown. The rotation of the camshaft is achieved in a conventional manner via a transmission from the engine crankshaft (not shown). A clearance regulating device 16, which adjusts the clearance between the camshaft 10 and the valve mechanism for controlling the exhaust valve 7 when activated, is arranged at one end 17 of the rocker arm. It is of the hydraulic type comprising a piston 18 moving within a hydraulic cylinder 19 mainly in the direction of movement of the valve 7 and is designed to attain, by hydraulic means, different positions in the rocker arm, thereby giving a head 21 acting against the valve stem 20 a varying degree of protrusion. The head 21 is in contact with an upper part of the valve stem 20 in order thereby to transmit the rocker arm movement to the valve 7. The return movement of the valve is ensured in the conventional way by means of a not shown valve spring. The hydraulic cylinder 19 of the clearance regulating device 16 is connected to a longitudinal hydraulic duct 22 in the rocker arm axle 15. This duct is common to all rocker arms on this shaft. In the rocker arm 11 there is a connecting duct 23, leading from the hydraulic duct 22 to the hydraulic cylinder 19 via a control—and check valve device 24, which will be described closer below with reference to FIG. 3. The hydraulic pressure and thus the hydraulic fluid flow rate in the duct 22 and thereby also the flow rate to the hydraulic cylinder 19 of the clearance regulating device 16, is controlled by means of a not shown control device. Said cylinder is of the single-acting type and comprises a pressure relief valve 25 of the check valve type for limiting the surface pressure of the contact surfaces, in the shown example in the shape of a ball 28 held against a valve seat 27 in the direction away from the exhaust valve 7 by a spring 26. Said valve is arranged to be closed for hydraulic cylinder pressures below a set value, but to open the connection to the drainage duct 29 above that set value. The function of the valve will be described in detail below.

FIG. 3 shows in more detail an example of the embodiment of the control- and check valve device 24. The valve device 24 thus is a pilot operated check valve comprising a ball 32, pressed by a spring 30 against a seat 31. The valve device is arranged to be open at a hydraulic pressure in the hydraulic duct 22 above a certain value as well as at a hydraulic pressure below a certain value with an aim to reset the clrearance regulating device 16 in a way to be closer described below. At hydraulic pressures above a certain value the ball 32 is kept depressed, i.e. open, by the direct fluid pressure against the ball. At pressures below a certain value the ball is kept depressed by a hydraulic control device 33, which then mechanically keeps the ball 32 away from its seat 31. The control device 33 consists of an as such known piston 34, being forced in the direction against the ball by a spring 35. The piston 34 shows a trunklike end portion 36, which at low pressure in the hydraulic duct 22, below a certain value, keeps the ball 32 depressed and thereby open through the action of the spring 35. When the hydraulic pressure exceeds said lower certain value, i.e. when the pressure on the piston 34 exceeds the force from the spring 35, the ball is no longer affected by the piston 34.

Each rocker arm is in the conventional way equipped with a roller 37 which follows the cam curve for each cylinder of the camshaft 10 during its rotation, with or without clearance. The clearance, which is preferably located between the roller 37 and the camshaft 10 is changed by the clearance regulating device 16 in a way to be described in more detail below. On the camshaft 10 there is, besides the cam 11, arranged at least one low extra cam ridge 38, which is brought to open the exhaust valve at a certain crankshaft angle provided that the compression retarder and thereby the clearance regulating device 16 is activated.

The extra cam 38 is intended to open the exhaust valve so that the store pressure energy inside the cylinder close to the upper dead centre is dumped out, without any work being executed. The pressure inside the cylinder, before the exhaust valve is opened, also acts on the bottom surface of the exhaust valve, causing high forces to be needed for opening the valve when the cylinder pressure is high. These forces are directly influencing the surface pressure created between the roller 37 on the rocker arm 14 and the cam ridge 38. Therefore the limit value for the maximum allowed surface pressure also decides which maximum cylinder pressure can be accepted at the time of valve opening.

The pressure inside the cylinders is determined by a number of parameters, of which some are highly affected by the operating conditions.

Figure 4:
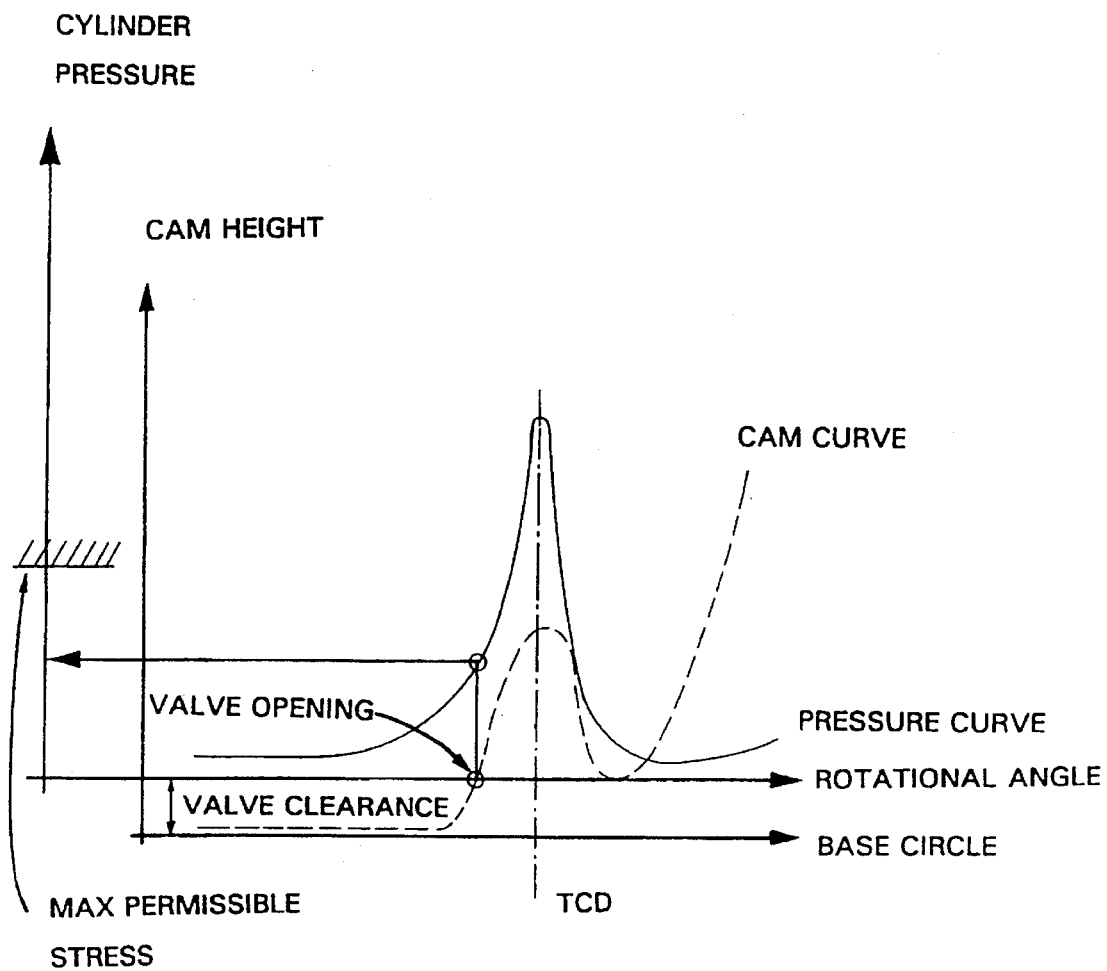

Under continuous engine retardation conditions the cylinder pressure with activated compression retarder at the time of opening the exhaust valve for cylinder pressure dumping will show such values that the surface pressure between the cam ridge 38 and the roller 37 lie within acceptable limits. The cylinder pressure curve and the opening point in time in relation to said curve is shown in FIG. 4

Figure 5:
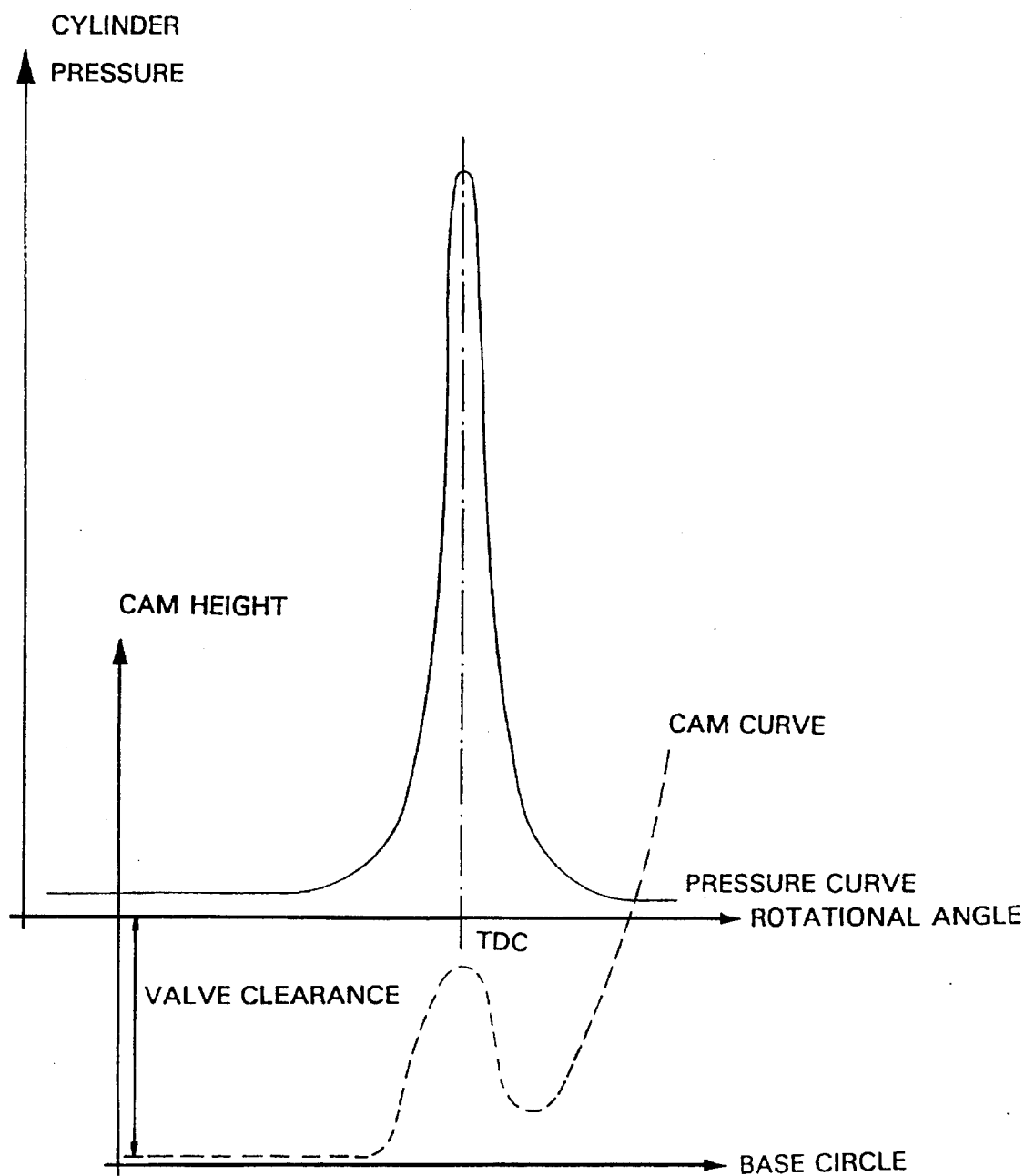
Figure 6:
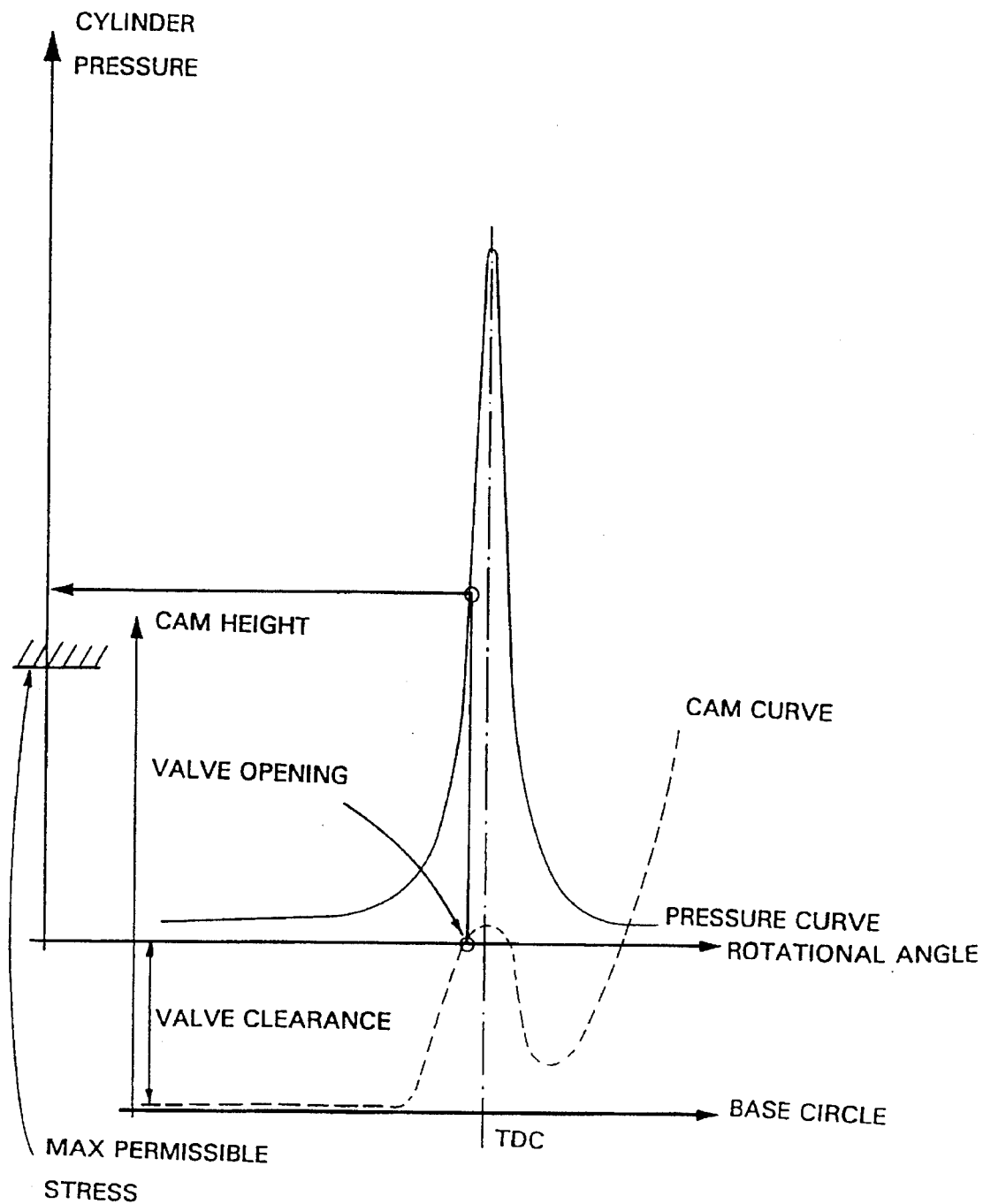
Figure 7:
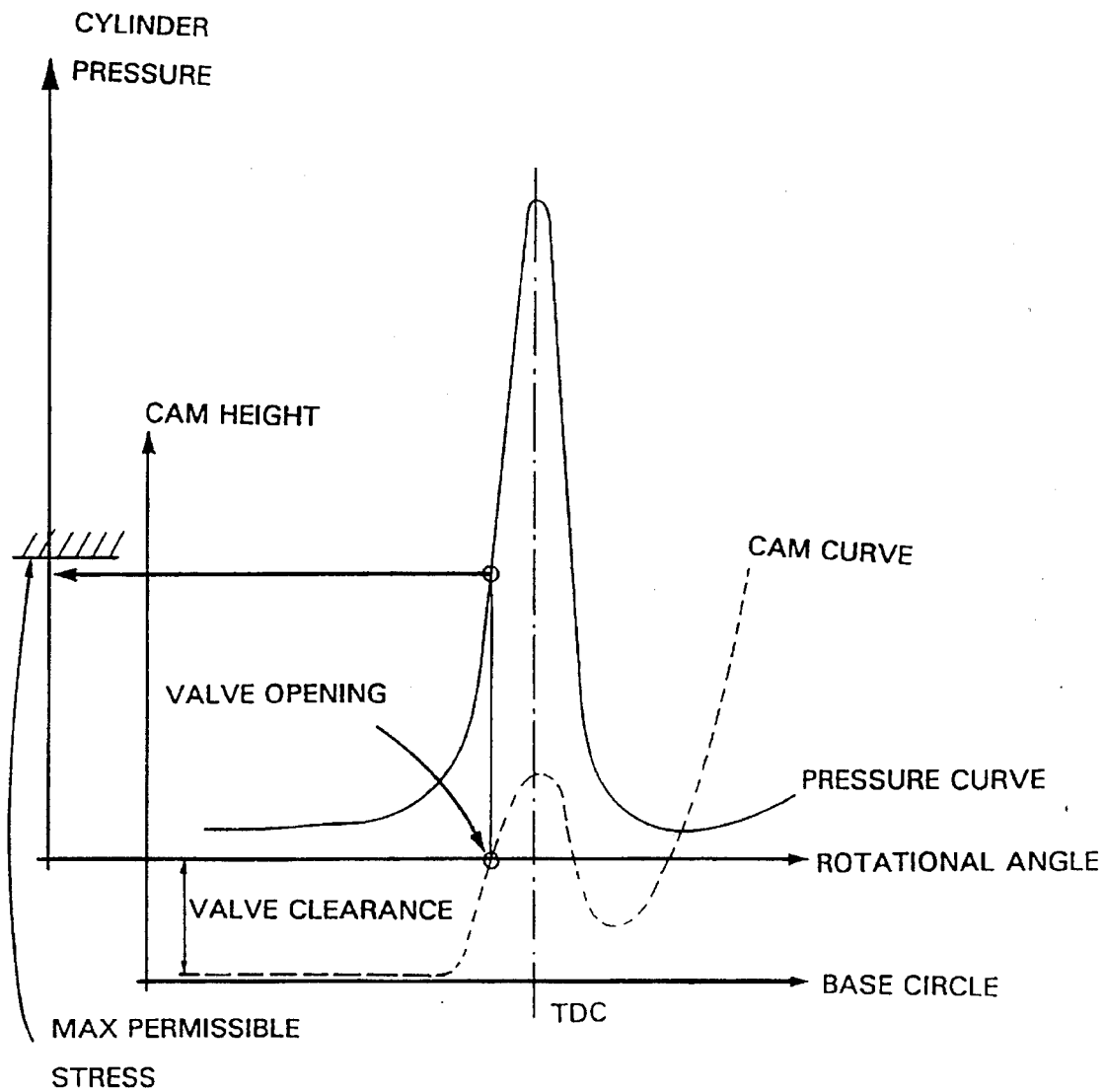

When the engine is pulled around without activation of the compression retarder (e.g when the fuel is switched off but the engine is pulled around by the vehicle going downhill), the cylinder pressure may rise to more than double of what is normal in the case above at the time of valve opening. This entails that twice the force, compared to the case above, is needed to open the valve at the upper dead centre and this would bring about entirely unacceptable surface pressures between the cam ridge 38 and the roller 37. When the compression retarder is not activated, a clearance exceeding the height of the extra ridge 38 is maintained, as shown in FIG. 5. This clearance is achieved by the compression retarder regulator 14 (not show) governing the flow in the duct 22 so that the hydraulic piston 18 and thereby its head 21 will maintain a sufficiently withdrawn position so that the extra ridge 38 will not affect the rocker arm and thereby not the valve 7. When the compression retarder is initiated, either manually by driver actuation from the driver's cab or automatically by a not shown control system, the regulator governs the hydraulic flow rate and thereby the pressure in the hydraulic cylinder 19 so that the hydraulic piston 18 is pushed outwards, whereby the valve clearance is gradually reduced below the height of the extra ridge 38, which is shown in FIG. 6. From this figure it can be seen that the valve movement curve is pushed upwards and as the valve clearance is reduced the movement of the exhaust valve will follow the dashed curve.

Valve opening at slow gradual clearance compensation will not happen until close to the upper dead centre, see FIG. 6, entailing excessive surface pressures unless counteractive measures are taken. FIG. 6 thus shows, for the sake of clarity, the case where a pressure relief valve 25 is not present in the clearance regulating device 16 or is sized without knowledge of load conditions and their consequences.

According to the present invention, the pressure relief valve 25 has therefore been thoroughly calibrated to a carefully selected value. The pressure relief valve serves as a force limiter, that strives to be closed at an exactly calibrated closing force, this being achieved by its spring 26 being exactly calibrated regarding its spring force and by the ball 28 sealing against a shape-wise well defined seat. By the pressure relief valve 25 limiting the oil pressure to a pre-set level the surface pressure of the contact surfaces between the components included, i.e. between the upper end (20) of the exhaust valve 7 and the head 21 of the rocker arm 14 and between the camshaft 10 cam ridges and the cam roller 37, will be limited.

Also during a quicker clearance compensation it might still happen that the point in time, at which the extra cam ridge 38 tries to open the exhaust valve, lies within the range where the cylinder pressure is unacceptably high, which entails a triggering of the pressure relief valve 25, the result of which is that a valve opening for compression retardation is not taking place during this crankshaft revolution. In other cases, such as during the revolution after which the pressure relief valve was triggered, because a maximum time span is then available, the valve clearance has had time to be reduced to such a degree, that the opening point in time will arrive so early that the cylinder pressure is still sufficiently low for the force to be maintained within acceptable values, see FIG. 7.

To sum up, principle for the adjustment of the pressure relief valve according to the invention can be expressed as follows, based upon the existence of a defined relation between the hydraulic pressure in the clearance regulating device and the time of valve opening. The respective clearance is gradually brought to zero or close to zero while the pressure within corresponding clearance regulating device is limited to a predetermined value, whereby, independently of when in time during the cylinder work cycle the engine retardation is initiated, the risk of an opening against a, from a stress aspects, too high cylinder pressure is eliminated.

As the efficiency of a compression retarder is higher the closer to the upper dead centre the exhaust valve can be opened, i.e. against the higher cylinder pressure it can be opened during retardation, it is very important that the highest practically usable cylinder pressure under steady state conditions is not limited by circumstances under other running conditions like for example the initiation of the retarder. By the method and device according to the present invention a considerably higher braking power from the compression retarder is achieved, compared to what had otherwise been possible with the existing practical limitations of e.g. surface pressure.

The invention is not limited to the embodiment described above and shown in the figures, but can be varied within the frame of the following patent claims. For example, the so called AT regulator can be excluded completely. The control of flow rate and pressure in the hydraulic system does not in principle have to be connected to the lubrication of the rocker arm axle. Flow rate and pressure changes in the hydraulic system can be achieved in various ways. For example, a fixed hydraulic fluid pressure may be maintained in a separate supply line, while pressure and flow rate changes are achieved by a controlled drainage of the hydraulic fluid. Alternatively, the drainage may be replaced by a positive flow rate and pressure control from a hydraulic fluid source. If separate hydraulic systems are installed for each cylinder it is conceivable in principle to exclude the control- and check valve 24. In practice, two extra cam ridges are often used for compression retardation. In the present application only the, from a pressure standpoint, critical extra cam ridge or ridges have been included, as the rest of the cam ridges are not relevant to the present invention.

I claim:

1. A method for engine retardation in a multi-cylinder combustion engine including a crankshaft, a plurality of cylinders, a plurality of corresponding pistons for said plurality of cylinders, at least one exhaust valve for regulating the connection between at least one of said plurality of cylinders and an engine exhaust system, a valve control mechanism including at least one camshaft for continuously controlling said at least one exhaust valve in response to the position of said crankshaft, said at least one camshaft including at least one extra cam ridge, said method comprising selectively opening said at least one exhaust valve at least when at least one of said pistons corresponding to said at least one of said plurality of cylinders is in its compression phase by hydraulically controlling the clearance in said valve control mechanism in response to a hydraulic fluid pressure up to a maximum pressure value controlled by a pressure relief valve, whereby said at least one extra cam ridge causes said at least one exhaust valve to be opened at a predetermined clearance in said valve control mechanism, gradually reducing said clearance towards zero, and limiting the pressure in said hydraulic fluid controlling said clearance to a predetermined pressure value thereby reducing the risk of opening said at least one exhaust valve during a cylinder pressure greater than a predetermined cylinder pressure.

2. The method of claim 1 wherein said hydraulically controlling said clearance in said valve control mechanism comprises controlling the fluid pressure between a hydraulic fluid source connected to said valve control mechanism and said fluid pressure in said valve control mechanism.

3. The method of claim 2 wherein said engine include a plurality of valve control mechanisms, and including separately hydraulically controlling said clearance in each of said plurality of valve control mechanisms based upon the difference between said fluid pressure in said hydraulic fluid source and the fluid pressure in each of said valve control mechanisms.

4. The method claim 1 including maintaining direct communication between said hydraulic fluid source and said valve control mechanism when said fluid pressure is below a first predetermined value and when said fluid pressure is above a second predetermined value, said first predetermined value being less than said second predetermined value, and periodically closing said connection between said hydraulic fluid source and said valve control mechanism.

5. Apparatus for engine retardation in a multi-cylinder combustion engine comprising a crankshaft, a plurality of cylinders, a plurality of corresponding pistons for said plurality of cylinders, at least one exhaust valve for regulating the connection between at least one of said plurality of cylinders and an engine exhaust system, a valve control mechanism including at least one camshaft for continuously controlling said at least one exhaust valve in response to the position of said crankshaft, said at least one camshaft including at least one extra ridge, a hydraulically operated clearance regulator for regulating the clearance between said valve control mechanism in response to a hydraulic fluid pressure below a predetermined maximum value, whereby the angular position of said crankshaft at which said at least one exhaust valve is operated by said at least one extra ridge is determined by said clearance in said valve control mechanism, a pressure relief valve for maintaining said hydraulic fluid pressure below said predetermined maximum value, and control means for gradually reducing said clearance towards zero while said hydraulic fluid pressure is maintained below said predetermined maximum value whereby the risk of operating said at least one exhaust valve during a cylinder pressure greater than the predetermined value is substantially reduced.

6. The apparatus of claim 5 including a plurality of said valve control mechanisms for controlling a plurality of said exhaust valves, said hydraulically operated clearance regulator including a common hydraulic fluid source for said plurality of valve control mechanisms, hydraulic fluid duct means for connecting said common hydraulic fluid source with said plurality of valve control mechanisms, and a corresponding plurality of control valves in said hydraulic fluid duct means for sensing differences in the hydraulic fluid pressure between said valve control mechanisms and said hydraulic fluid duct means.

7. The apparatus of claim 6 wherein said plurality of control valves includes check valve means for opening said control valves at hydraulic fluid pressures in said hydraulic fluid duct means less than a first hydraulic fluid pressure value and greater than a second hydraulic fluid pressure value, said first hydraulic fluid pressure value being less than said second hydraulic fluid pressure value and for periodically closing said plurality of control valves.

* * * * *

UNITED STATES PATENT AND TRADEMARK OFFICE
CERTIFICATE OF CORRECTION

PATENT NO. : 5,564,385
DATED : October 15, 1996
INVENTOR(S) : Hakansson

It is certified that error appears in the above-indentified patent and that said Letters Patent is hereby corrected as shown below:

On the cover page: "[86]    PCT No.:    PCT/SE93/00467
　　　　　　　　　　§ 371 Date:  Dec. 16, 1994
　　　　　　　　　　§ 102(e) Date: Dec. 16, 1994"

should read:   --[86]   PCT No.:    PCT/SE93/00467
　　　　　　　　　　§ 371 Date:  Feb. 15, 1995
　　　　　　　　　　§ 102(e) Date: Feb. 15, 1995--.

Column 4, line 56, "extra cam 38" should read --extra cam ridge 38--.

Column 4, line 57, "store" should read --stored--.

Column 6, line 8, "up, principle" should read --up, the principle--.

Column 7, line 18, "ference" should read --ferences--.

Column 7, line 21, "method claim 1" should read --method of claim 1--.

Signed and Sealed this

Twenty-first Day of January, 1997

Attest:

BRUCE LEHMAN

Attesting Officer　　　　Commissioner of Patents and Trademarks